United States Patent
Dash et al.

(10) Patent No.: US 12,302,450 B2
(45) Date of Patent: May 13, 2025

(54) COORDINATED PWS WARNING DELIVERY IN 5G NETWORKS

(71) Applicant: Radisys Corporation, Hillsboro, OR (US)

(72) Inventors: Nalinikanta Dash, Odisha (IN); Bhawani Sankar Satpathy, Odisha (IN); Rajendra Prasad Kodaypak, Hillsboro, OR (US)

(73) Assignee: Radisys Corporation, Hillsboro, OR (US)

( * ) Notice: Subject to any disclaimer, the term of this patent is extended or adjusted under 35 U.S.C. 154(b) by 415 days.

(21) Appl. No.: 17/938,240

(22) Filed: Oct. 5, 2022

(65) Prior Publication Data

US 2024/0121859 A1 Apr. 11, 2024

(51) Int. Cl.
*H04W 76/50* (2018.01)
*H04W 68/00* (2009.01)
*H04W 92/24* (2009.01)

(52) U.S. Cl.
CPC ......... *H04W 76/50* (2018.02); *H04W 68/005* (2013.01); *H04W 92/24* (2013.01)

(58) Field of Classification Search
CPC ... H04W 76/50; H04W 68/005; H04W 92/24; H04W 88/085
See application file for complete search history.

(56) References Cited

U.S. PATENT DOCUMENTS

| | | | | |
|---|---|---|---|---|
| 2020/0053817 A1* | 2/2020 | Hayashi | ............... | H04W 68/005 |
| 2020/0322773 A1* | 10/2020 | Han | ................. | H04W 4/90 |
| 2020/0367146 A1* | 11/2020 | Sharma | ............ | H04W 48/10 |
| 2021/0352621 A1* | 11/2021 | Hayashi | ............ | H04W 48/12 |
| 2023/0085267 A1* | 3/2023 | Suh | ................. | H04W 48/12 |
| | | | | 455/404.1 |

OTHER PUBLICATIONS

3GPP TS 38.473 V16.0.0 (Dec. 2019), Technical Specification, 3rd Generation Partnership Project; Technical Specification Group Radio Access Network; NG-RAN; NG application protocol (NGAP), (Release 16), Dec. 2019, 335 pages. (Year: 2019).*
3GPP TS 38.493 V16.0.0 (Dec. 2019), Technical Specification, 3rd Generation Partnership Project; Technical Specification Group Radio Access Network; NG-RAN; F1 application protocol (F1AP), (Release 16), Dec. 2019, 239 pages. (Year: 2019).*
3GPP TS 29.518 V16.0.0 (Dec. 2019), Technical Specification, 3rd Generation Partnership Project; Technical Specification Group Radio Access Network; NG-RAN; Access and Mobility Management Services, (Release 16), Dec. 2019, 199 pages. (Year: 2019).*

* cited by examiner

*Primary Examiner* — Phirin Sam
*Assistant Examiner* — Tarell A Hampton
(74) *Attorney, Agent, or Firm* — Stoel Rives LLP

(57) ABSTRACT

Disclosed are embodiments for PWS success indication message exchange on multiple signaling interfaces. In some embodiments, PWS success indication messages are exchanged over the F1 interface between a DU and CU, the N2 interface between CU and AMF, and the service-based interface between AMF and CBCF.

19 Claims, 19 Drawing Sheets

| Field | Bits | Reference |
|---|---|---|
| Short Messages Indicator | 2 | |
| Short Messages | 8 | |
| Frequency domain resource assignment | x | RAT Type 1 |
| Time domain resource assignment | 4 | SLIV |
| VRB-to-PRB mapping | 1 | 0 : Non-Interleaved<br>1 : Interleaved |
| Modulation and coding scheme | 5 | 64 QAM Table,256 QAM Table., Low SE 64 QAM Table |
| TB scaling | 2 | Used to determine TBS size for short message or msg2 is carried else this bit field is reserved .<br>Possible values 1, 0.5, 0.25 |
| Reserved | 6 | |

FIG. 10

< 38.212 – Table 7.3.1.2.1-1: Short Message indicator > — 1002

| Bit Field | Short Message Indicator |
|---|---|
| 00 | Reserved |
| 01 | Only scheduling information for Paging is present in the DCI |
| 10 | Only short message is present in the DCI |
| 11 | Both scheduling information for Paging and short messages are present in the DCI |

< 38.331 – Table 6.5-1: Short messages > — 1004

| Bit | Short Message Indicator |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification |
| 3-[8] | Not used in this release of the specification, and shall be ignored by UE if received. |

FIG. 11

| Field | Bits | Reference |
|---|---|---|
| Frequency domain resource assignment | X | RAT Type 1 |
| Time domain resource assignment | 4 | SLIV |
| VRB-to-PRB mapping | 1 | 0 : Non-Interleaved<br>1 : Interleaved |
| Modulation and coding scheme | 5 | 64 QAM Table, 256 QAM Table, Low SE 64 QAM Table |
| Redundancy Version | 2 | RV values changed for SI repetition |
| Reserved | 16 | |

FIG. 12

| IE/Group Name | Presence | Range | IE type and reference | Semantics description | Criticality | Assigned Criticality |
|---|---|---|---|---|---|---|
| Message Type | M | | | | YES | ignore |
| Transaction ID | M | | | | YES | reject |
| Message Identifier | M | | | | YES | reject |
| Serial Number | M | | | | YES | reject |
| PWS success NR CGI List | | | | | YES | ignore |
| >PWS success NR CGI Item IEs | | 1..<maxCellingNBDU> | | | EACH | ignore |
| >>NR CGI | M | | | | - | |
| >>Number of Successful Broadcast | O | | | | - | |

FIG. 14

| IE/Group Name | Presence | Range | IE type and reference | Semantics description | Criticality | Assigned Criticality |
|---|---|---|---|---|---|---|
| Message Type | M | | | | YES | ignore |
| Message Identifier | M | | | | YES | reject |
| Serial Number | M | | | | YES | reject |
| CHOICE PWS Success Cell List | M | | | | YES | reject |
| >E-UTRA | | | | | | |
| >>PWS Success E-UTRA Cell List | | 1..<maxnoofCellsinngeNB> | | | | |
| >>>E-UTRA CGI | M | | | | | |
| >>>Number of Successful Broadcasts | O | | | | | |
| >NR | | | | | | |
| >>PWS Success NR Cell List | | 1..<maxnoofCellsingNB> | | | | |
| >>>NR CGI | M | | | | | |
| >>>Number of Successful Broadcasts | O | | | | | |
| TAI List for PWS Success | | 0..<maxnoofTAIforSuccess> | | | Yes | ignore |
| >TAI | M | | | | | |
| Emergency Area ID for PWS Success | | 0..<maxnoofEAIforSuccess> | | | Yes | ignore |
| >Emergency Area ID | M | | | | | |
| Global RAN Node ID | M | | | | YES | reject |

FIG. 16

COORDINATED PWS WARNING DELIVERY IN 5G NETWORKS

TECHNICAL FIELD

This application relates generally to wireless communication systems, and more specifically to techniques for confirming delivery of a public warning message in 5G systems.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi.

In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

An Open Radio Access Network (O-RAN) is a disaggregated approach to deploying mobile fronthaul and midhaul networks built on cloud native principles. O-RAN is an evolution of the Next Generation RAN (NG-RAN) architecture, first introduced by the GSMA's 3GPP in their release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN radio unit (O-RU), an O-RAN distributed unit (O-DU), and an O-RAN central unit (O-CU).

3GPP networks support the public warning system (PWS) to alert the public to events such as disasters. For instance, when earthquakes, tsunamis, hurricanes, or wildfires occur, the PWS can be used to notify people to evacuate impacted areas within a certain time. In addition, the PWS can be used to notify people of a child abduction emergency (e.g., AMBER alert). Different countries may have different requirements on delivery of warning messages. Thus, 3GPP networks provide different warning systems for different countries, such as the earthquake and tsunami warning system (ETWS) first developed for use in Japan; wireless emergency alert (WEA, formerly known as the Commercial Mobile Alert System (CMAS), and prior to that as the Personal Localized Alerting Network (PLAN)) in the US; the Korean public alert system (KPAS), and EU-ALERT.

SUMMARY OF THE DISCLOSURE

In the standards specifications, there are procedures defined for exchanging PWS cancellation and PWS failure indication messages. However, there are still critical technical gaps such as the lack of definition of PWS success indication message exchange within the O-RAN as well as between the O-RAN and 5G core. Such gaps should be promptly addressed by the industry community to enable global mobile network operators to design, implement, and deliver full scale broadcast warning services to the emerging 5G user/device population. This disclosure, therefore, addresses these technical gaps with a message exchange that takes place between the O-RAN or gNB network functions and communicates to the core network functions.

Disclosed are embodiments for PWS success indication message exchange on multiple signaling interfaces, including (1) the F1 interface between a DU and CU, (2) the N2 interface between CU and an access and mobility management function (AMF) and (3) the service-based interface between an AMF and a cell broadcast center function (CBCF).

In one aspect, a method, performed by a DU for a RAN node in a 5G communication network defining one or more cells, of signaling PWS success indication is disclosed. The method includes receiving, from a CU via an F1 interface with the DU, a write-replace warning message to trigger warning alert delivery by broadcasting, from an RU via an air interface, a system information block (SIB) including a warning message, generating a PWS success indication message for the CU to inform the CU regarding successful delivery of the warning message over the air interface, and in response to the RU completing broadcasting of the SIB successfully across the one or more cells, triggering delivery to the CU of the PWS success indication message over the F1 interface.

The method may also include the triggering delivery to the CU of the PWS success indication message over the F1 interface causing the CU to forward the PWS success indication message to an AMF for forwarding a success-indication-NG-RAN request/indication to a CBCF.

The method may also include the RAN being an O-RAN and the RU, DU, and CU are disaggregated from each other, or the DU and RU form part of a gNB.

The method may also include the generating the PWS success indication message including generating a transaction ID information element.

The method may also include the generating the PWS success indication message including generating an information element indicating a number of times the DU has successfully broadcasted a received warning message.

The method may also include the generating the PWS success indication message including generating a PWS success NR cell global identity (CGI) list having a PWS success NR CGI item information element.

The method may also include the SIB being one of more of a SIB6, SIB7, and SIB8.

The method may also include providing a PWS success delivery message to a RAN management orchestration engine.

In one aspect, a method, performed by a CU for a RAN node in a 5G communication network defining one or more cells, of signaling PWS success indication is disclosed. The method includes receiving, from a DU over an F1 interface with the CU, a first PWS success indication message to inform the CU regarding successful delivery of a warning message over an air interface, generating a second PWS success indication message for an AMF to inform the AMF regarding successful delivery of the warning message over the air interface, and in response to receiving the first PWS success indication message, triggering delivery to the AMF of the second PWS success indication message over an NG interface with the CU.

The method may also include the generating the second PWS success indication message including generating a message identifier information element.

The method may also include the generating the second PWS success indication message including generating a tracking area identity (TAI) information element.

The method may also include the generating the second PWS success indication message including generating an information element indicating a number of times the RAN has successfully broadcasted a received warning message.

The method may also include the second PWS success indication message including an emergency area ID.

The method may also include the generating the second PWS success indication message including generating a global RAN node ID information element.

In one aspect, a method, performed by an AMF in communication with a RAN node in a 5G communication network defining one or more cells, of signaling PWS success indication is disclosed. The method includes receiving, from a CU over an NG interface with the CU, a PWS success indication message to inform the AMF regarding successful delivery of a warning message over an air interface, generating a success-indication-NG-RAN request/indication message for a CBCF to inform the CBCF regarding successful delivery of the warning message over the air interface, and in response to receiving the PWS success indication message, triggering delivery to the CBCF of the success-indication-NG-RAN request/indication message over a Namf interface with the CBCF.

The method may also include the generating the success-indication-NG-RAN request/indication message including generating a message identifier information element.

The method may also include the generating the success-indication-NG-RAN request/indication message including generating a success cell list NG-RAN to lists cells in which PWS broadcasting is successful.

The method may also include the generating the success-indication-NG-RAN request/indication message including generating a global RAN node ID information element.

The method may also further include providing the success-indication-NG-RAN request/indication message related performance measurements to a network data analytics function (NWDAF) for generating PWS service data analytics.

PWS success indication messages may be adopted and defined per standards so as to avoid any interoperability issues during system design, feature implementation, lab/field certification, and/or dependencies between multiple vendor-specific network functions components. A reliable end-to-end service delivery is realized when the RAN and core network functions work in conjunction with each other.

This delivery mechanism will help operators gain warning message service-related data analytics and insights in the RAN and core domains that can be securely exposed on demand to the external agencies.

The disclosed techniques enables service providers to proactively monitor, track, and ensure reliable broadcast alert services are delivered to a variety of 5G endpoints including traditional devices/smart phones and IoT devices. Standardizing successful delivery of broadcast warning messages delivery in the 5G mobility network ensures the RAN and core network functions work in a coordinated manner targeting reliable service delivery.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 10 is a table of information corresponding to a message shown in FIG. 9.

FIG. 11 are tables of information corresponding to fields shown in the table of FIG. 10.

FIG. 12 is a table of information corresponding to a message shown in FIG. 9.

FIG. 14 is a table showing information elements in the PWS success indication message of FIG. 13.

FIG. 16 is a table showing information elements in the PWS success indication message of FIG. 15.

DETAILED DESCRIPTION OF EMBODIMENTS

Figure 1:
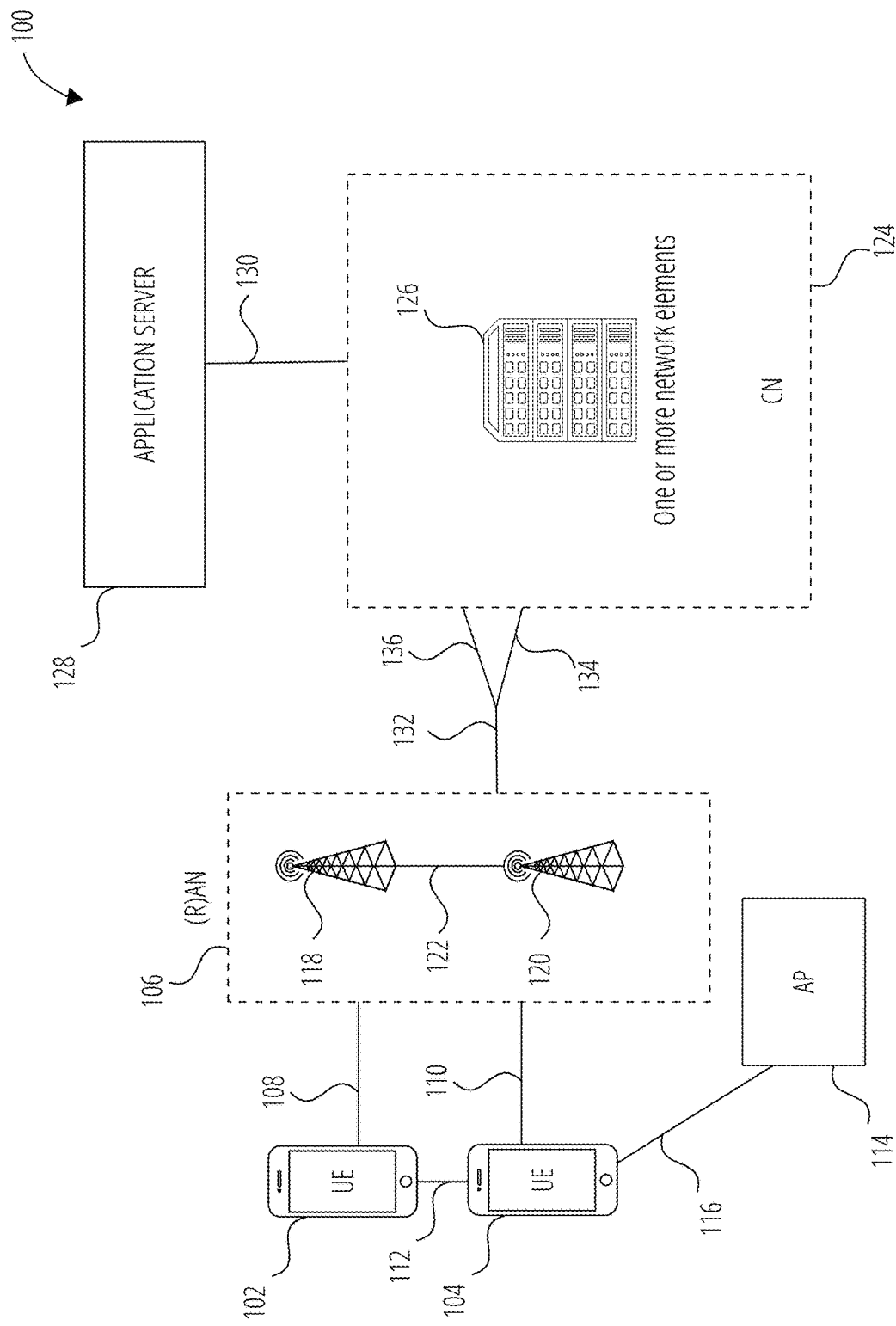
FIG. 1 is a block diagram of a wireless communications system, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, system 100 includes UE 102 and UE 104. In this example, UE 102 and UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, UE 102 and/or UE 104 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

UE 102 and UE 104 may be configured to connect, for example, communicatively couple, with an access node or radio access node (shown as (R)AN 106). In embodiments, (R)AN 106 may be an NG RAN or a 5G RAN, an E-UTRAN, or a legacy RAN, such as a UTRAN or GERAN. As used herein, the term "NG RAN" or the like may refer to a (R)AN 106 that operates in an NR or 5G system, and the term "E-UTRAN" or the like may refer to a (R)AN 106 that operates in an LTE or 4G system. UE 102 and UE 104 utilize connections (or channels) (shown as connection 108 and connection 110, respectively), each of which comprises a physical communications interface or layer (discussed in further detail below).

In this example, connection 108 and connection 110 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, UE 102 and UE 104 may directly exchange communication data via a ProSe interface 112. ProSe interface 112 may alternatively be referred to as a sidelink (SL) interface 110 and may comprise one or more logical channels, including but not limited to a PSCCH, a PSSCH, a PSDCH, and a PSBCH.

UE 104 is shown to be configured to access an AP 114 (also referred to as "WLAN node," "WLAN," "WLAN Termination," "WT" or the like) via connection 116. Connection 116 can comprise a local wireless connection, such as a connection consistent with any IEEE 802.11 protocol, wherein the AP 114 would comprise a wireless fidelity (Wi-Fi®) router. In this example, AP 114 may be connected to the Internet without connecting to the core network of the wireless system (described in further detail below). In various embodiments, UE 104, (R)AN 106, and AP 114 may be configured to utilize LWA operation and/or LWIP operation. The LWA operation may involve UE 104 in RRC_CONNECTED being configured by RAN node 118 or RAN node 120 to utilize radio resources of LTE and WLAN. LWIP operation may involve UE 104 using WLAN radio resources (e.g., connection 116) via IPsec protocol tunneling to authenticate and encrypt packets (e.g., IP packets) sent over connection 116. IPsec tunneling may include encapsulating the entirety of original IP packets and adding a new packet header, thereby protecting the original header of the IP packets.

(R)AN 106 can include one or more AN nodes, such as RAN node 118 and RAN node 120, that enable the connection 108 and connection 110. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 100 (e.g., an eNB). According to various embodiments, RAN node 118 or RAN node 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of RAN node 118 or RAN node 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 118 or RAN node 120); a MAC/PHY split wherein RRC, PDCP, RLC, and MAC layers are operated by the CRAN/vBBUP and the PHY layer is operated by individual RAN nodes (e.g., RAN node 118 or RAN node 120); or a "lower PHY" split wherein RRC, PDCP, RLC, MAC layers and upper portions of the PHY layer are operated by the CRAN/ vBBUP and lower portions of the PHY layer are operated by individual RAN nodes. This virtualized framework allows the freed-up processor cores of the RAN node 118 or RAN node 120 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in (R)AN 106 (not shown) or by a server pool in a similar manner as the CRAN/vBBUP. Additionally, or alternatively, one or more of RAN node 118 or RAN node 120 may be next generation eNB s (ng-eNBs), which are RAN nodes that provide E-UTRA user plane and control plane protocol terminations toward UE 102 and UE 104, and are connected to an 5GC via an NG interface (discussed infra). In V2X scenarios one or more of RAN node 118 or RAN node 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink (UL) and downlink (DL) communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

RAN node 118 and/or RAN node 120 can terminate the air interface protocol and can be the first point of contact for UE 102 and UE 104. In some embodiments, RAN node 118 and/or RAN node 120 can fulfill various logical functions for (R)AN 106 including, but not limited to, radio network controller (RNC) functions such as radio bearer management, uplink and downlink dynamic radio resource management and data packet scheduling, and mobility management.

In embodiments, UE 102 and UE 104 can be configured to communicate using OFDM communication signals with each other or with RAN node 118 and/or RAN node 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from RAN node 118 and/or RAN node 120 to UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, UE 102 and UE 104 and RAN node 118 and/or RAN node 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, UE 102 and UE 104 and RAN node 118 or RAN node 120 may operate using LAA, eLAA, and/or feLAA mechanisms. In these implementations, UE 102 and UE 104 and RAN node 118 or RAN node 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 102 and UE 104, RAN node 118 or RAN node 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 102, AP 114, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require UE 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to UE 102 and UE 104. The PDCCH carries information about the transport format and resource allocations related to the PDSCH channel, among other things. It may also inform UE 102 and UE 104 about the transport format, resource allocation, and HARQ information related to the uplink shared channel. Typically, downlink scheduling (assigning control and shared channel resource blocks to UE 104 within a cell) may be performed at any of RAN node 118 or RAN node 120 based on channel quality information fed back from any of UE 102 and UE 104. The downlink resource assignment information may be sent on the PDCCH used for (e.g., assigned to) each of UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

RAN node 118 or RAN node 120 may be configured to communicate with one another via interface 122. In embodiments where system 100 is an LTE system (e.g., when CN 124 is an EPC), interface 122 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 102 from an SeNB for user data; information of PDCP PDUs that were not delivered to a UE 102; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where system 100 is a 5G or NR system (e.g., when CN 124 is an 5GC), interface 122 may be an Xn interface. The Xn interface is defined between two or more RAN nodes (e.g., two or more gNBs and the like) that connect to 5GC, between a RAN node 118 (e.g., a gNB) connecting to 5GC and an eNB, and/or between two eNBs connecting to 5GC (e.g., CN 124). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 102 in a connected mode (e.g., CM-CONNECTED) including functionality to manage the UE mobility for connected mode between one or more RAN node 118 or RAN node 120. The mobility support may include context transfer from an old (source) serving RAN node 118 to new (target) serving RAN node 120; and control of user plane tunnels between old (source) serving RAN node 118 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

(R)AN 106 is shown to be communicatively coupled to a core network-in this embodiment, CN 124. CN 124 may comprise one or more network elements 126, which are configured to offer various data and telecommunications services to customers/subscribers (e.g., users of UE 102 and UE 104) who are connected to CN 124 via (R)AN 106. The components of CN 124 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of CN 124 may be referred to as a network slice, and a logical instantiation of a portion of CN 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 128 may be an element offering applications that use IP bearer resources with the core network (e.g., UMTS PS domain, LTE PS data services, etc.). The application server 128 can also be configured to support one or more communication services (e.g., VoIP sessions, PTT sessions, group communication sessions, social networking services, etc.) for UE 102 and UE 104 via the EPC. Application server 128 may communicate with CN 124 through an IP communications interface 130.

In embodiments, CN 124 may be an 5GC. As described in 3GPP TS 23.501, 5G CN 124 includes an access and mobility management function (AMF), user plane function (UPF), session management function (SMF), authentication server function (AUSF), a network exposure function (NEF), a unified data management (UDM), a unified data repository (UDR), a short message service function (SMSF), a non-3GPP interworking function (N3IWF), and other 5G core network functions. A charging function (CHF) introduced in the 5G system architecture allows charging services to be offered in connection with an operations support system and business support system (OSS/BSS).

(R)AN 106 may be connected with CN 124 via an NG interface 132. In embodiments, NG interface 132 may be split into two parts, an NG user plane (NG-U) interface 134, which carries traffic data between RAN node 118 or RAN node 120 and a UPF, and S1 control plane (NG-C) interface 136, which is a signaling interface between RAN node 118 or RAN node 120 and AMFs.

In embodiments, CN 124 may be a 5G CN, while in other embodiments, CN 124 may be an EPC). Where CN 124 is an EPC, (R)AN 106 may be connected with CN 124 via an S1 interface 132. In embodiments, S1 interface 132 may be split into two parts, an S1 user plane (S1-U) interface 134, which carries traffic data between RAN node 118 or RAN node 120 and S-GW, and S1-MME interface 136, which is a signaling interface between RAN node 118 or RAN node 120 and MMEs.

Figure 2:
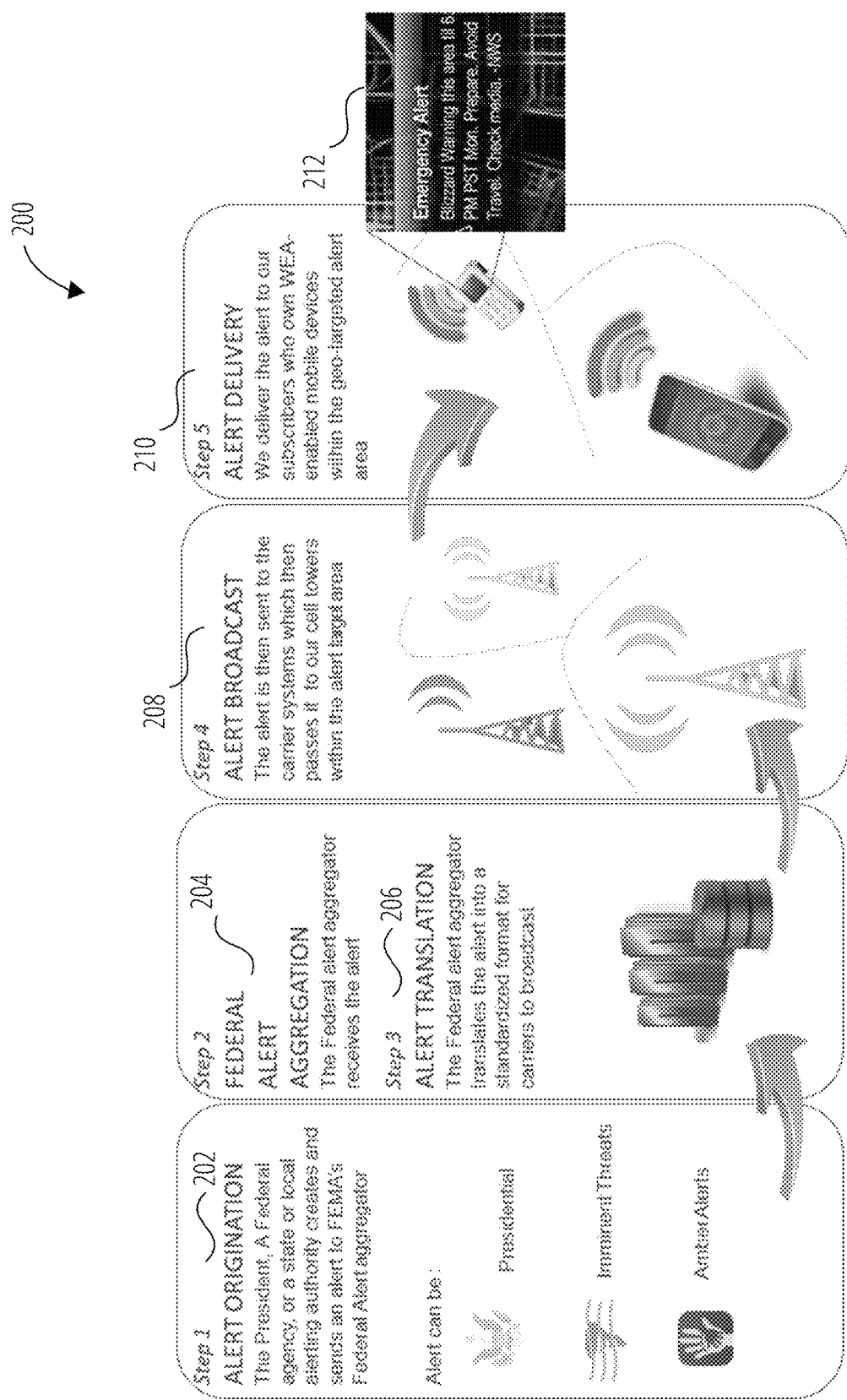
FIG. 2 is an annotated flow diagram showing warning alert origination and delivery, according to one embodiment.

FIG. 2 shows a process 200 for WEAs. Initially, process 200 entails originating 202 an emergency alert from the President of the United States, the National Weather Service (NWS), or other emergency operations centers. Next, process 200 entails federal agencies, (e.g., FEMA) aggregating 204 alerts at a federal alert aggregator. Process 200 then entails translating 206 the information to a standardized format for different participating cellular service providers to distribute the alerts to their customers with compatible devices via cell broadcast. These carriers may then begin broadcasting 208 the warnings to an alert target area using system information blocks (SIBs). Accordingly, process 200 entails delivery 210 of the warnings to different UEs to all phones using a cell tower. The UEs may then display 212 the warnings.

Figure 3:
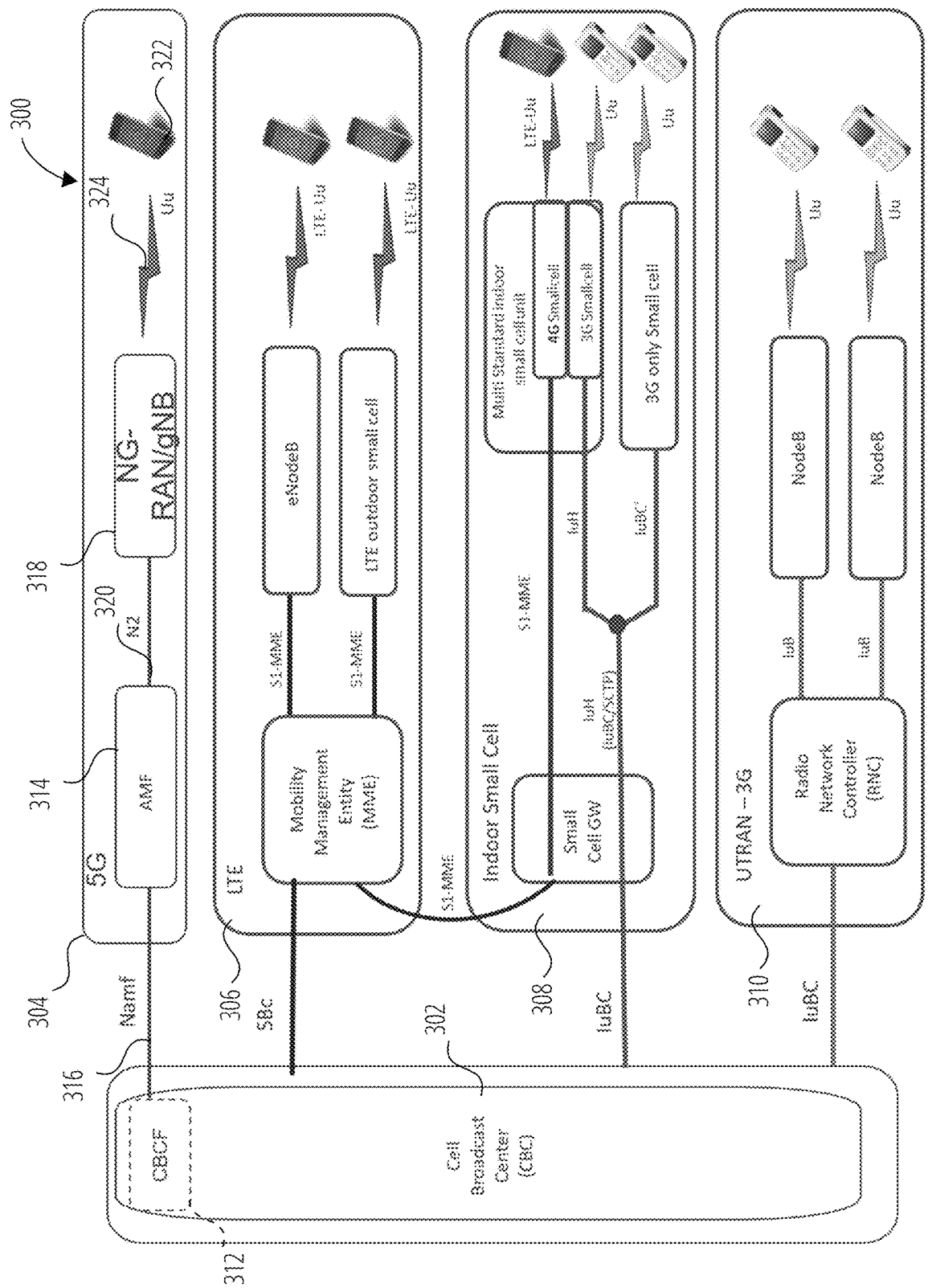
FIG. 3 is a block diagram of a system for cellular waring alert delivery over 5G, LTE, and 3G networks, according to one embodiment.

FIG. 3 shows a high-level architecture 300 for a WEA system. In this example, a cell broadcast center (CBC) 302 is in communication with a 5G mobility network 304, an LTE network 306 and small cell 308, and a 3G network 310. In particular, CBC 302 includes a cell broadcast center function (CBCF) 312 communicatively coupled to an AMF 314 through a Namf interface 316 in 5G mobility network 304. An NG-RAN/gNB 318 is communicatively coupled to AMF 314 though a N2 interface 320. And a UE 322 is communicatively coupled to NG-RAN/gNB 318 through an air Uu interface 324. Accordingly, 5G mobility network 304 provides for broadcasting of warning messages received over N2 interface 320 from the 5GC by means of system information broadcasting (SIB6/SIB7/SIB8) towards UE 322 over NR-Uu interface 324.

Figure 4:
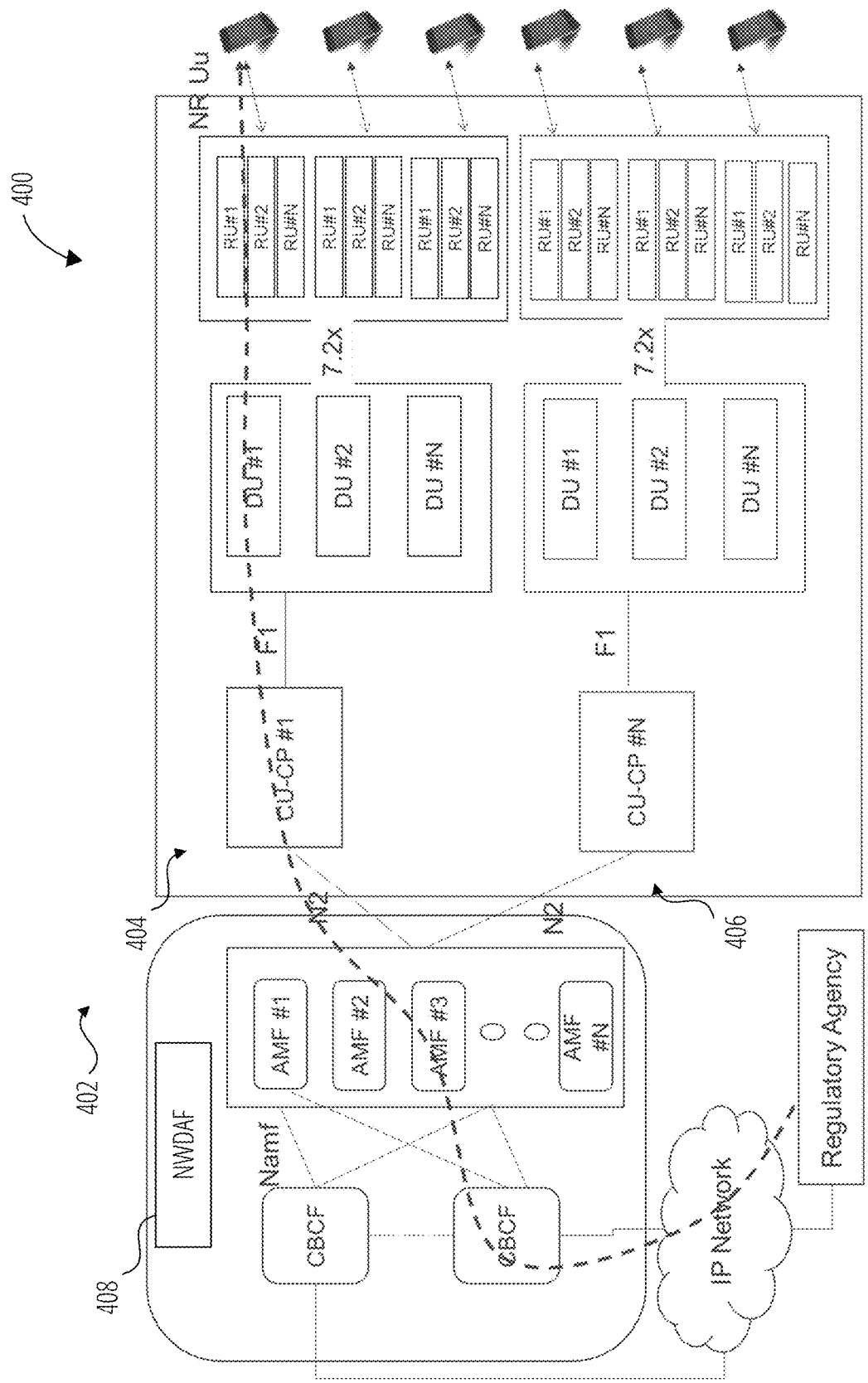
FIG. 4 is a block diagram showing in greater detail a 5G O-RAN example of the system shown in FIG. 3, according to one embodiment.

FIG. 4 shows another high-level architecture 400, which is similar to architecture 300. In terms of differences, however, unlike NG-RAN/gNB 318 in FIG. 3, architecture 400 shows an example of a 5G mobility network 402 including an O-RAN 404 and an O-RAN 406. Each 0-RAN 404, 406 includes a CU in communication with multiple DUs over an F1 interface. The DU are in communication with multiple RUs. Thus, a dashed line shows how a public warning message is directed to a specific RU, in the example of FIG. 4.

FIG. 4 also shows a network data analytics function (NWDAF) 408 for generating broadcast warning service-related data insights, explained later with reference to FIG. 16-FIG. 18.

Figure 5:
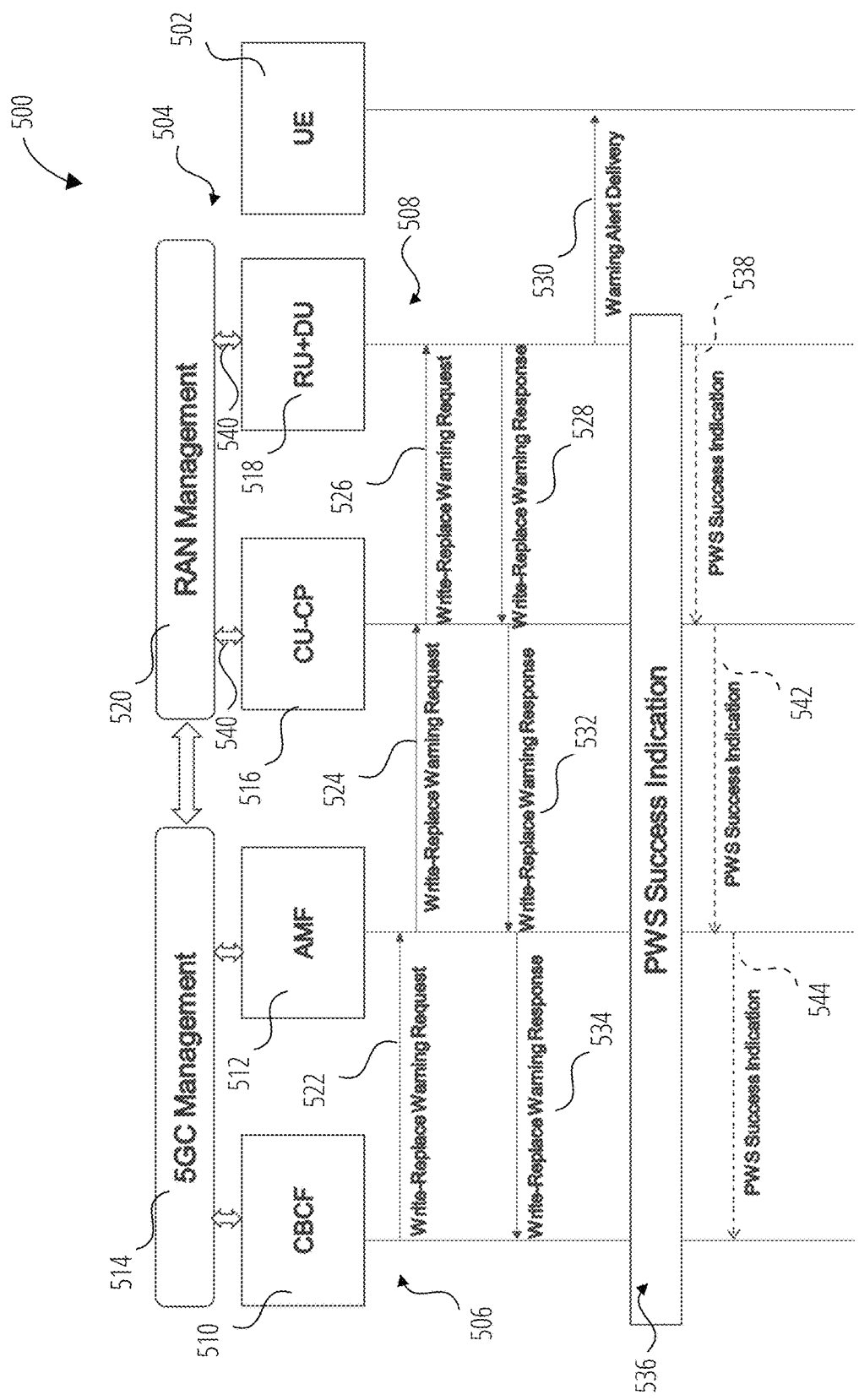
FIG. 5 is a message sequence diagram including a PWS success indication process, according to one embodiment.

FIG. 5 shows a message sequence diagram 500 for triggering a public warning message to be sent to a UE 502 receiving communications via a 5G mobility network 504. In this example, 5G mobility network 504 includes a 5GC 506 and an NG-RAN 508. 5GC 506 includes a CBCF 510 and an AMF 512, which are each managed using a 5G management orchestration engine 514. NG-RAN 508 includes a CU control plane (CU-CP) 516 and an integrated DU+RU 518, though in other embodiments the DU and RU may be separate components. CU-CP 516 and DU+RU 518 are managed using a RAN management orchestration engine 520.

Initially, CBCF 510 provides to AMF 512 a write-replace warning request 522. AMF 314 then forwards write-replace warning request 524 toward NG-RAN 508.

Once it receives write-replace warning request 524 over an NG interface, CU-CP 516 determines, based on the IEs in write-replace warning request 524, the type of public warning message, e.g., whether it is a primary or secondary ETWS notification or WEA notification. For instance, write-replace warning request 524 includes the following IEs: message identifier, warning type, warning message contents, concurrent warning message indicator, and other IEs. In some embodiments, additional IEs include information on number of broadcasts requested, repetition period, warning area list, data coding scheme, and other such information.

If received request is determined as a primary ETWS notification, then SIB6 will be generated. For a secondary ETWS notification, SIB7 will be generated. For both primary and secondary ETWS notification, then both SIB6 and SIB7 will be generated. And for CMAS (WEA), SIB8 will be generated at CU-CP 516.

CU-CP 516 will use received IE message identifier and/or serial number and/or warning message contents and/or concurrent warning message indicator within write-replace warning request 524, to determine if a duplicate warning message is received or to replace an ongoing warning message with newer warning message.

CU-CP 516 will forward the generated 902s in IE PWS system information towards DU+RU 518 within a write-replace warning request 526 over F1 interface, along with additional details received over NG interface such as number of broadcasts requested, repetition period, and the like. Thus, CU-CP 516 forwards write-replace warning request 526 to DU+RU 518.

Once DU+RU 518 receives write-replace warning request 526, is prioritizes resources for processing the received warning message. If DU+RU 518 is able to process received write-replace warning request 526 and can schedule received warning SIBs, then DU+RU 518 will acknowledge with a write-replace warning response 528 towards CU-CP 516 containing IE cell broadcast completed list indicating list of cells in DU+RU 518 for which DU+RU 518 is able to process received write-replace warning request 526. If in case DU+RU 518 is unable to process received write-replace warning request 526 for any of the cells or all the cells, then DU+RU 518 will exclude IE cell broadcast completed list within write-replace warning response 528.

After sending write-replace warning response 528, DU+RU 518 starts broadcasting of SIB6/SIB7/SIB8 messages over the air to UE 502 in a warning alert delivery 530. Thus, actual broadcasting of warning SIBs (SIB6/SIB7/SIB8) over the air interface will only be after DU+RU 518 acknowledges received write-replace warning request 526.

In response to write-replace warning response 528, CU-CP 516 forwards a write-replace warning response 532 to AMF 512. Specifically, once CU-CP 516 receives write-replace warning response 528 from DU+RU 518, CU-CP 516 will send an acknowledgement over NG interface towards AMF 512 using write-replace warning response 532 containing IE broadcast completed area list. If warning message broadcasting is unsuccessful, then CU-CP 516 will omit IE broadcast completed area list within write-replace warning response 532.

Finally, AMF 512 sends a write-replace warning response 534 to CBCF 510 once write-replace warning response 532 is received.

There is no standardized mechanism defined currently to indicate once warning message is successfully broadcasted over air interface. As per 3GPP standards (e.g., 3GPP TS 38.473 v16.8, section 8.5.1), for 5GC 506 to start broadcasting of any warning message within NG-RAN 508, AMF 512 sends write-replace warning request 526 to a DU, e.g., DU+RU 518, and DU+RU 518 acknowledges by sending write-replace warning response 528 back to CU-CP 516. CU-CP 516 triggers this delivery based on the reception of this write-replace warning request 522 via AMF 512 from CBCF 510 in 5GC 506, per 3GPP TS 38.413 and 29.518.

Note, however, as CU-CP 516 is not aware when the requested warning message broadcasting will be completed for warning alert delivery 530, in the event of F1 link and/or path transmission failures, CU-CP 516 may consider that warning message broadcasting has failed, even if it was successfully broadcasted by DU+RU 518. Also, in the event of N2 link failures between CU-CP 516 and AMF 512, CU-CP 516 may trigger a PWS cancel request message (not shown) towards DU+RU 518 as it has no knowledge about completion of warning message even if broadcasting of warning message is successful at DU+RU 518.

Previously, once warning alert delivery 530 is completed by DU+RU 518, there was no standards-defined procedure or method for DU+RU 518 to inform CU-CP 516, via the F1 interface, of the successful delivery of warning message over the air to UE 502. As warning message warning alert delivery 530 is a critical service that has potential impacts to human life and society, all network functions within the 5G mobility network 504 should be aware of successful broadcast of warning messages.

In order to have coordination among all node as well as in order to avoid any ambiguity during warning message broadcasting across different nodes of 5G NR network (e.g., DU, CU/CU-CP, AMF, and CBCF), this disclosure describes a new and end-to-end message procedure shown as a PWS success indication process 536. Accordingly, the bottom of FIG. 5 shows PWS success indication process 536 for 0-RAN deployments, though the same process could also apply for gNB deployments.

In PWS success indication process 536, DU+RU 518 has triggered broadcasting of warning message over air interface using SIBs (SIB6/SIB7/SIB8). Details of the scheduling and broadcasting are described later with reference to FIG. 9.

Once DU+RU 518 completes broadcasting of warning SIBs successfully across one or more cells, then it will trigger a PWS success indication 538 towards CU-CP 516 over the F1 interface. Additional details of PWS success indication 538 are described later with reference to FIG. 13 and FIG. 14. FIG. 5 also shows that CU-CP 516 and DU+RU 518 (e.g., DU) indicate (e.g., through an API) a PWS success delivery 540 to RAN management orchestration engine 520 for data analytics.

Subsequently, a PWS success indication 542 is forwarded by CU-CP 516 towards AMF 512 over the NG interface. Additional details of PWS success indication 542 are described later with reference to FIG. 15 and FIG. 16.

Finally, AMF 512 forwards a PWS success indication 544 towards CBCF 510 over the Namf interface. Additional details of PWS success indication 544 (i.e., success-indication-NG-RAN request/indication message) are described later with reference to FIG. 17 and FIG. 18.

If PWS success indication 538 is not sent by DU+RU 518, then integrity of warning message delivery will not be known to peer node CU-CP 516. This will lead to ripple effect in communication between CU-CP 516 and AMF 512 as well between AMF 512 and CBCF 510. This will also result in end-to-end network inefficiency due to lack of PWS success indication message integrity and impacts overall service delivery.

Figure 6:
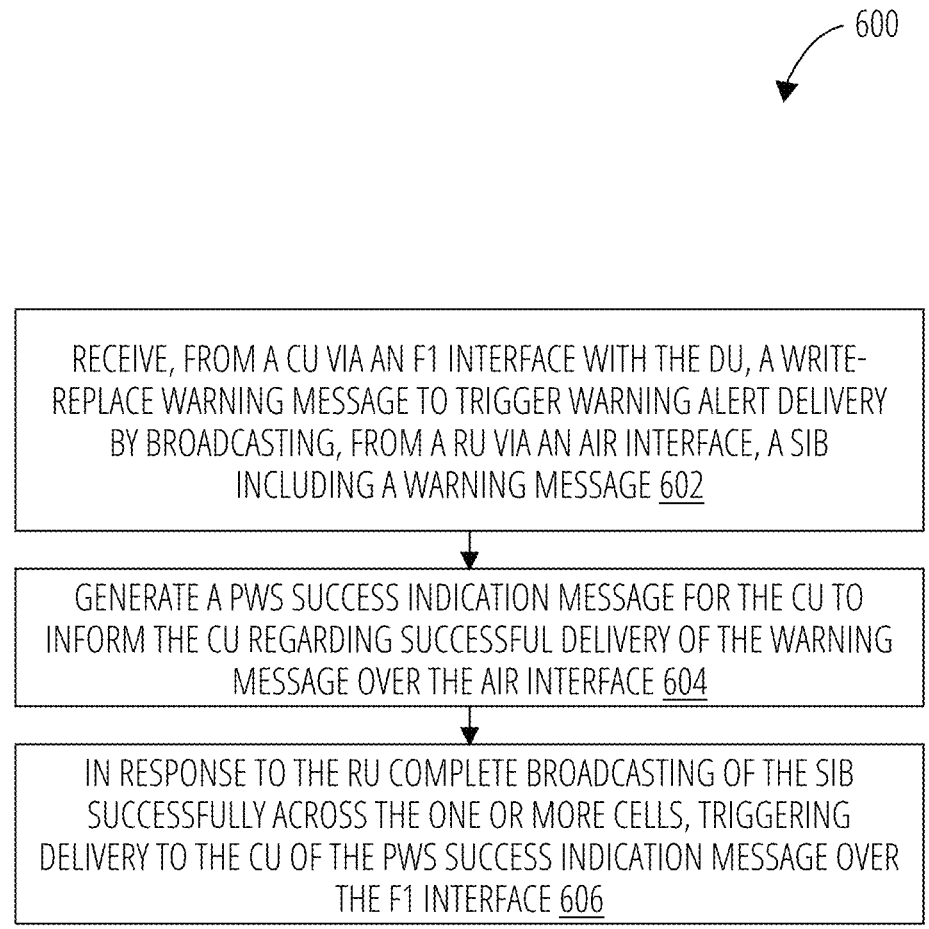
FIG. 6 is a flow chart of a process, in accordance with one embodiment.

FIG. 6 shows a process 600, performed by a DU for a RAN node in a 5G communication network defining one or more cells, of signaling PWS success indication. In block 602, process 600 receives, from a CU via an F1 interface with the DU, a write-replace warning message to trigger warning alert delivery by broadcasting, from a RU via an air interface, a SIB including a warning message. In block 604, process 600 generates a PWS success indication message for the CU to inform the CU regarding successful delivery of the warning message over the air interface. In block 606, process 600 in response to the RU completes broadcasting of the SIB successfully across the one or more cells, triggering delivery to the CU of the PWS success indication message over the F1 interface.

Figure 7:
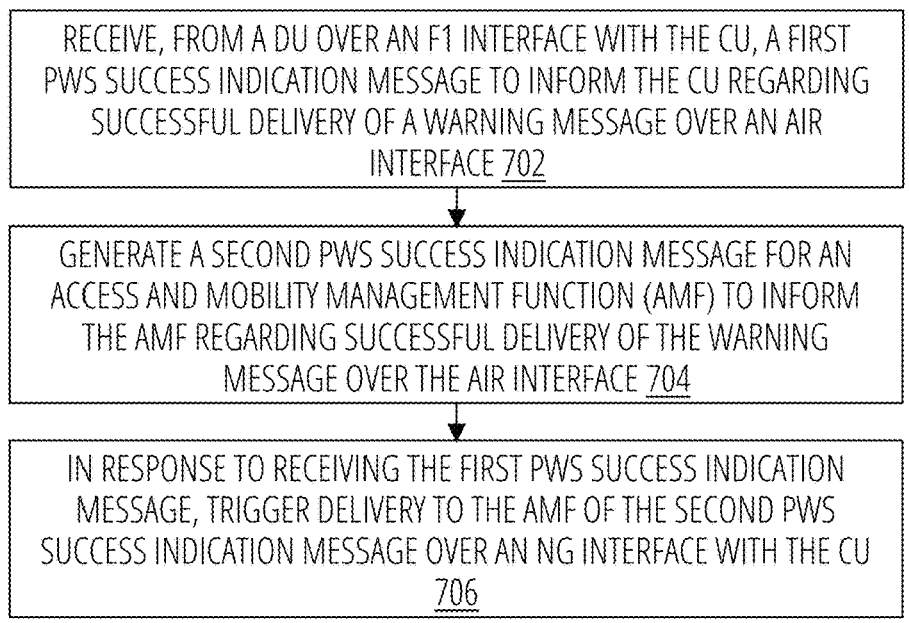
FIG. 7 is a flow chart of a process, in accordance with one embodiment.

FIG. 7 shows a process 700, performed by a CU for a RAN node in a 5G communication network defining one or more cells, of signaling PWS success indication. In block 702, process 700 receives, from a DU over an F1 interface with the CU, a first PWS success indication message to inform the CU regarding successful delivery of a warning message over an air interface. In block 704, process 700 generates a second PWS success indication message for an access and mobility management function (AMF) to inform the AMF regarding successful delivery of the warning message over the air interface. In block 706, process 700 in response to receiving the first PWS success indication message, triggers delivery to the AMF of the second PWS success indication message over an NG interface with the CU.

Figure 8:
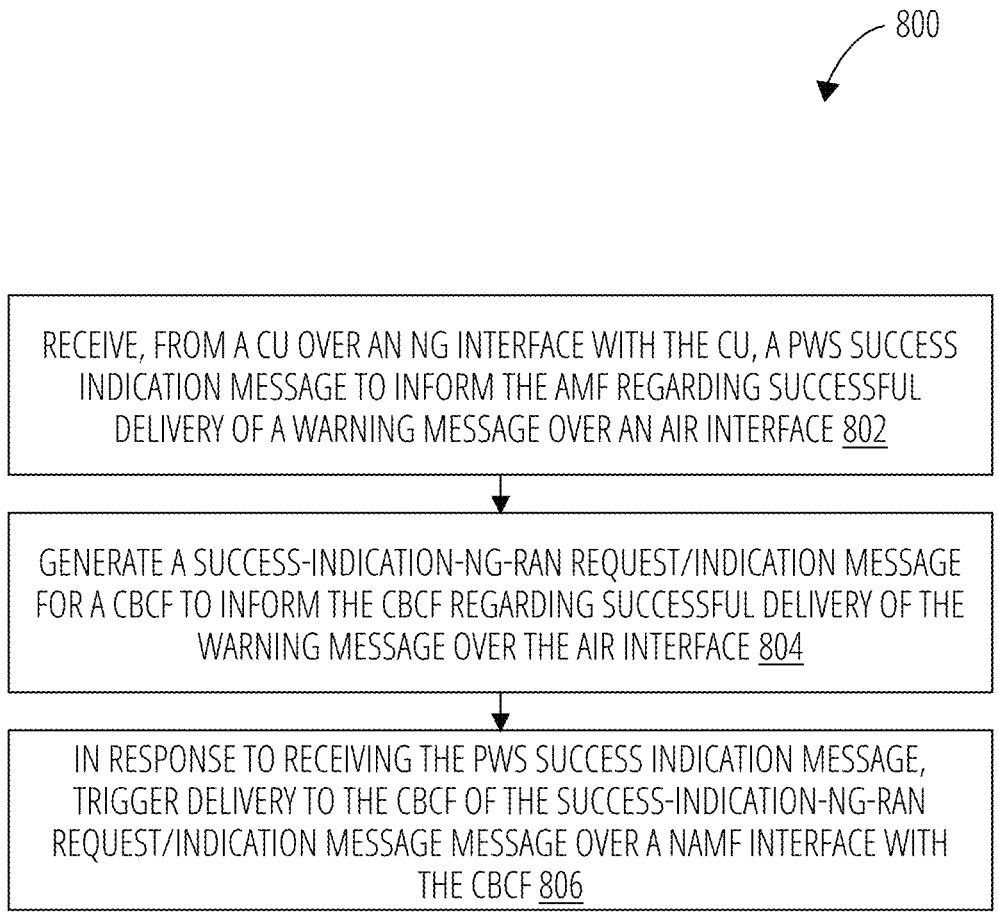
FIG. 8 is a flow chart of a process, in accordance with one embodiment.

FIG. 8 shows a process 800, performed by an AMF in communication with a radio access network (RAN) node in a 5G communication network defining one or more cells, of signaling PWS success indication. In block 802, process 800 receives, from a CU over an NG interface with the CU, a PWS success indication message to inform the AMF regarding successful delivery of a warning message over an air interface. In block 804, process 800 generates a success-indication-NG-RAN request/indication message for a CBCF to inform the CBCF regarding successful delivery of the warning message over the air interface. In block 806, process 800 in response to receiving the PWS success indication message, triggers delivery to the CBCF of the success-indication-NG-RAN request/indication message over a Namf interface with the CBCF.

Figure 9:
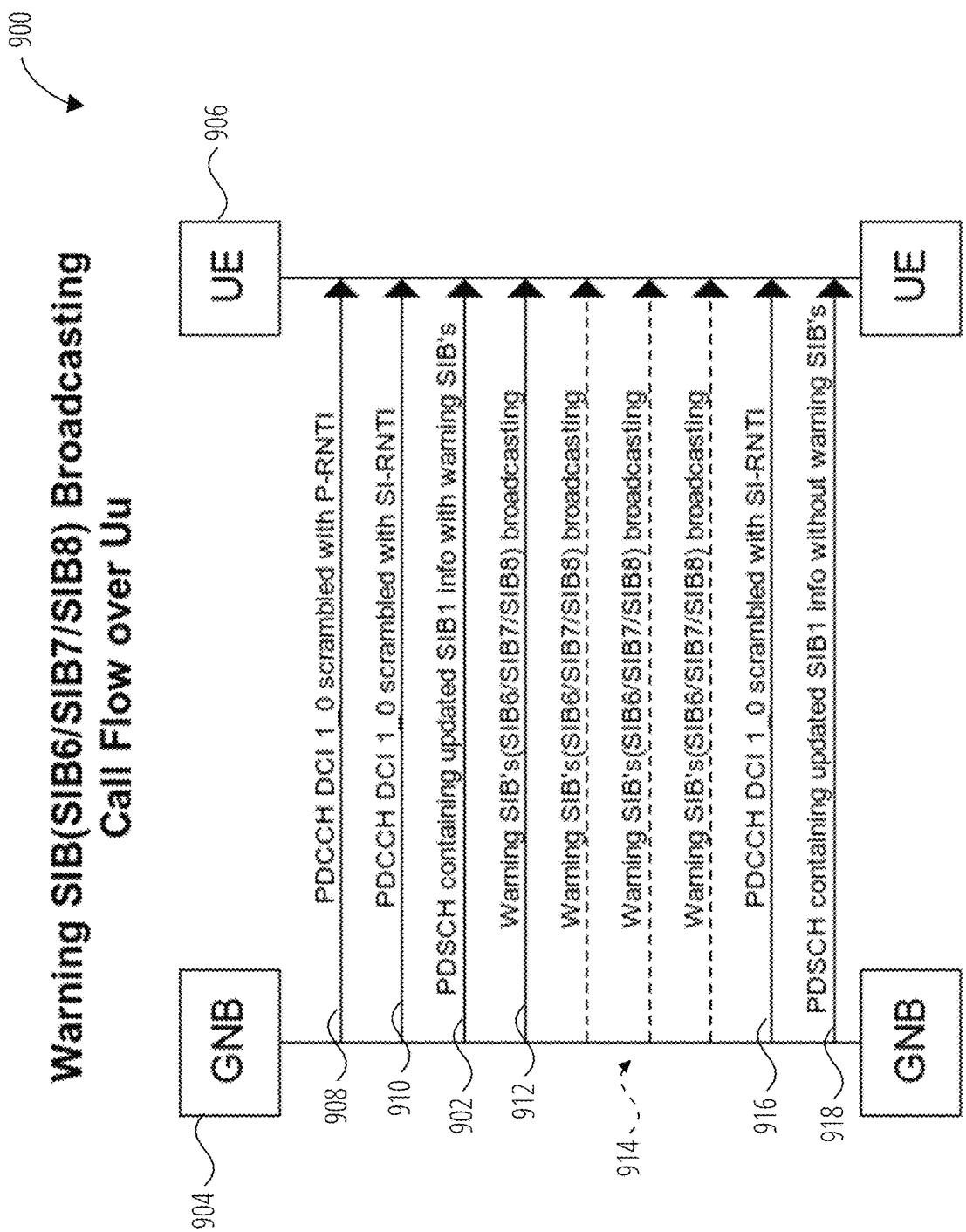
FIG. 9 is a message sequence diagram showing scheduling and broadcast of SIBs for warning delivery, according to one embodiment.

FIG. 9 shows a message sequence diagram 900 of a process for broadcasting a warning SIB (e.g., SIB6/SIB7/SIB8) over the Uu (air) interface from a gNB 904 to a UE 906. In this example, the process is performed by gNB, but in other embodiments, the process could be performed by an O-RAN.

A gNB-DU in gNB 904 schedules warning messages in such a way that all UEs across the cells served by the gNB-DU would have at least one valid paging occasion to read paging for warning information. The gNB-DU schedules paging info using a Layer 1 paging mechanism, i.e., PDCCH DCI 1_0 scrambled with P-RNTI 908 (with the value of P-RNTI fixed, i.e., hex FFFE). Example details of PDCCH DCI 1_0 scrambled with P-RNTI 908 are shown in FIG. 10.

The gNB-DU also schedules downlink control information (DCI) with updated SIB1 containing scheduling information of warning SIBs (SIB6/SIB7/SIB8) along with warning SIBs (SIB6/SIB7/SIB8) using PDCCH DCI 1_0 scrambled with SI-RNTI 910. Example details of PDCCH DCI 1_0 scrambled with SI-RNTI 910 are shown in FIG. 12.

Next, the gNB-DU parallelly starts broadcasting of warning SIBs (SIB6/SIB7/SIB8) along with a PDSCH containing updated SIB1 information with warning SIB scheduling information 902.

Once UE 906 reads paging, it will proceed in acquiring SIB1 which contains scheduling information of warning SIBs 912 (SIB6/SIB7/SIB8) within IE SI-SchedulingInfo.

As UE 906 already knows location where warning SIBs are getting broadcasted after acquiring SIB1, UE 906 can proceed and acquire warning SIBs 912.

The gNB-DU will repeat 914 scheduling of warning SIBs 912 multiple times based on number of broadcast requested in its write-replace warning request (see, e.g., write-replace warning request 526, FIG. 5).

Finally, the gNB-DU provides PDCCH DCI 1_0 scrambled with SI-RNTI 916 and PDSCH containing updated SIB1 information without warning SIB scheduling information 918 to clear the scheduled warning message transmissions once warning messages are successfully delivered. This may act as a triggering mechanism for gNB-DU to trigger PWS success indication over F1 interface towards the gNB-CU.

FIG. 10 shows a table 1000 for PDCCH DCI 1_0 scrambled with P-RNTI 908. An initial two rows of table 1000 include a short message indicator 1002 and a short message 1004. Details on short message indicator 1002 and short message 1004 are shown in tables 1100 of FIG. 11.

FIG. 12 shows a table 1200 for PDCCH DCI 1_0 scrambled with SI-RNTI 910. In general, PDCCH DCI 1_0 scrambled with SI-RNTI 910 carries control information for SIB scheduling. For this disclosure, PDCCH DCI 1_0 scrambled with SI-RNTI 910 is used to schedule updated SIB1 containing scheduling details with/without warning SIBs (SIB6/SIB7/SIB8). Also, PDCCH DCI 1_0 scrambled with SI-RNTI 910 is used for carrying scheduling information associated with warning SIBs (SIB6/SIB7/SIB8) itself. SI-RNTI uses a fixed standardized value of hex FFFF.

Figure 13:
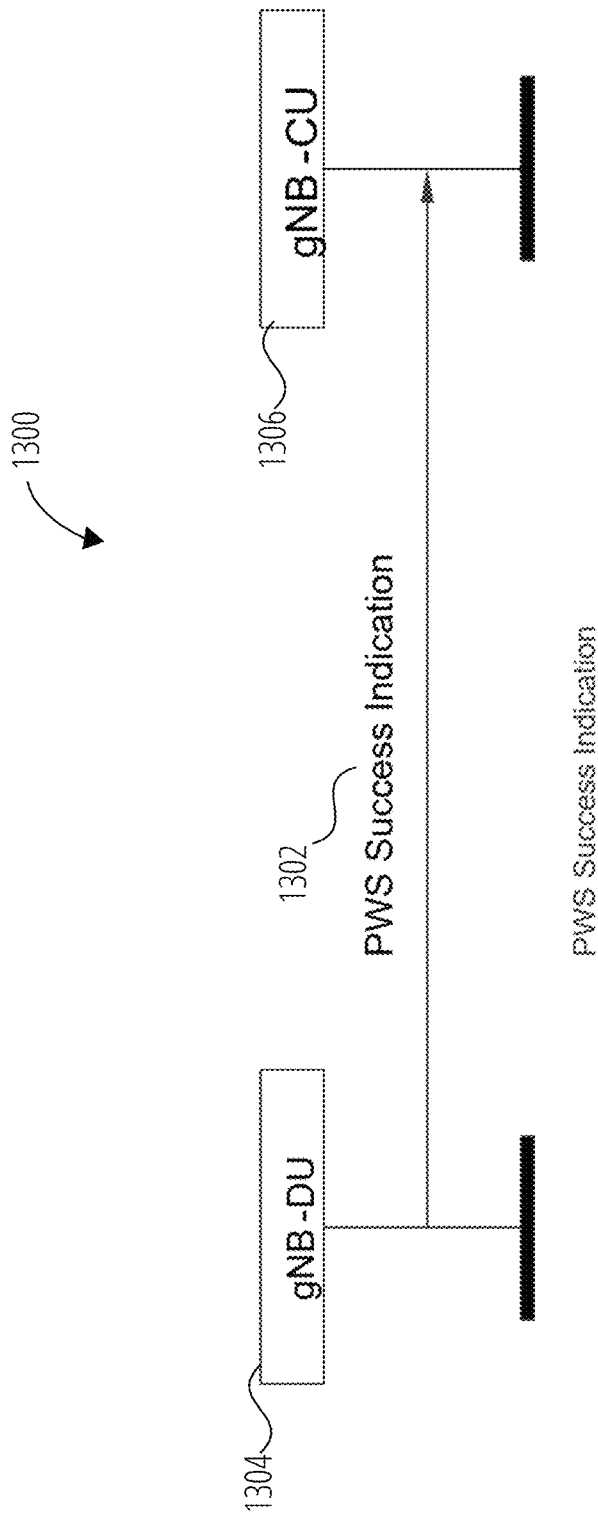
FIG. 13 is a message diagram for a PWS success indication message provided over an F1 interface.

FIG. 13 shows an example class 2 message exchange procedure 1300 of a PWS success indication message 1302 provided over an F1 interface (non-UE associated signaling) from a gNB-DU 1304 to a gNB-CU 1306 for indicating successful broadcasting of warning message. As mentioned previously, the purpose of class 2 message exchange procedure 1300 is to inform gNB-CU 1306 that gNB-DU 1304 has broadcasted PWS message successfully. Thus, gNB-DU 1304 initiates procedure 1300 by sending a PWS success indication message 1302 message to gNB-CU 1306 indicating broadcast of warning message is successful. In this example, there are no applicable abnormal conditions signaled.

FIG. 14 shows a table 1400 of IEs included in PWS success indication message 1302 (FIG. 13). For example, the IEs include transaction ID 1402, message identifier 1404, serial number 1406, NR cell global identity (NR CGI) 1408, number of successful broadcast 1410. PWS success indication message 1302 also includes a PWS success NR CGI list 1412 with PWS success NR CGI item 1414.

Transaction ID 1402 is an IE that uniquely identifies a procedure among all ongoing parallel procedures of the same type initiated by the same protocol peer. Messages belonging to the same procedure use the same transaction ID. The transaction ID is determined by the initiating peer of a procedure.

Message identifier 1404 is an IE that identifies the warning message. In some embodiments, networks would use message identifiers from the range 4352-6399 (hex 1100-hex 18FF) for PWS, as defined in 3GPP TS 22.268. List defined warning messages with warning message identifier is defined in 3GPP TS 23.041 section 9.4.1.2.2.

Serial number 1406 is an IE that identifies a particular message from the source and type indicated by the message identifier and is altered every time the message with a given message identifier is changed.

NR CGI 1408 is used to globally identify a cell. It contains PLMN ID+NR cell ID.

Number of successful broadcast 1410 indicates the number of times a gNB-DU has successfully broadcasted received warning messages. The range for this is from 0-65535. This value may be additionally used by operations, administration, and maintenance (OAM) or RAN orchestration in case of O-RAN for analytics purpose to enhance user experience.

With reference to PWS success NR CGI list 1412 and PWS success NR CGI item 1414, PWS success NR CGI list 1412 will contains "n" number of PWS success NR CGI items 1414, where "n" is number of cells supported by gNB-DU 1304 (each gNB-DU 1304 can be deployed with "n" number of cells). Each PWS success NR CGI item 1414 contains NR CGI 1408 and number of successful broadcast 1410. Thus, NR CGI 1408 will indicate for which cell within gNB-DU 1304 PWS broadcasting was successful. And the number of times broadcasting was successful within each NR CGI is indicated by number of successful broadcast 1410.

Figure 15:
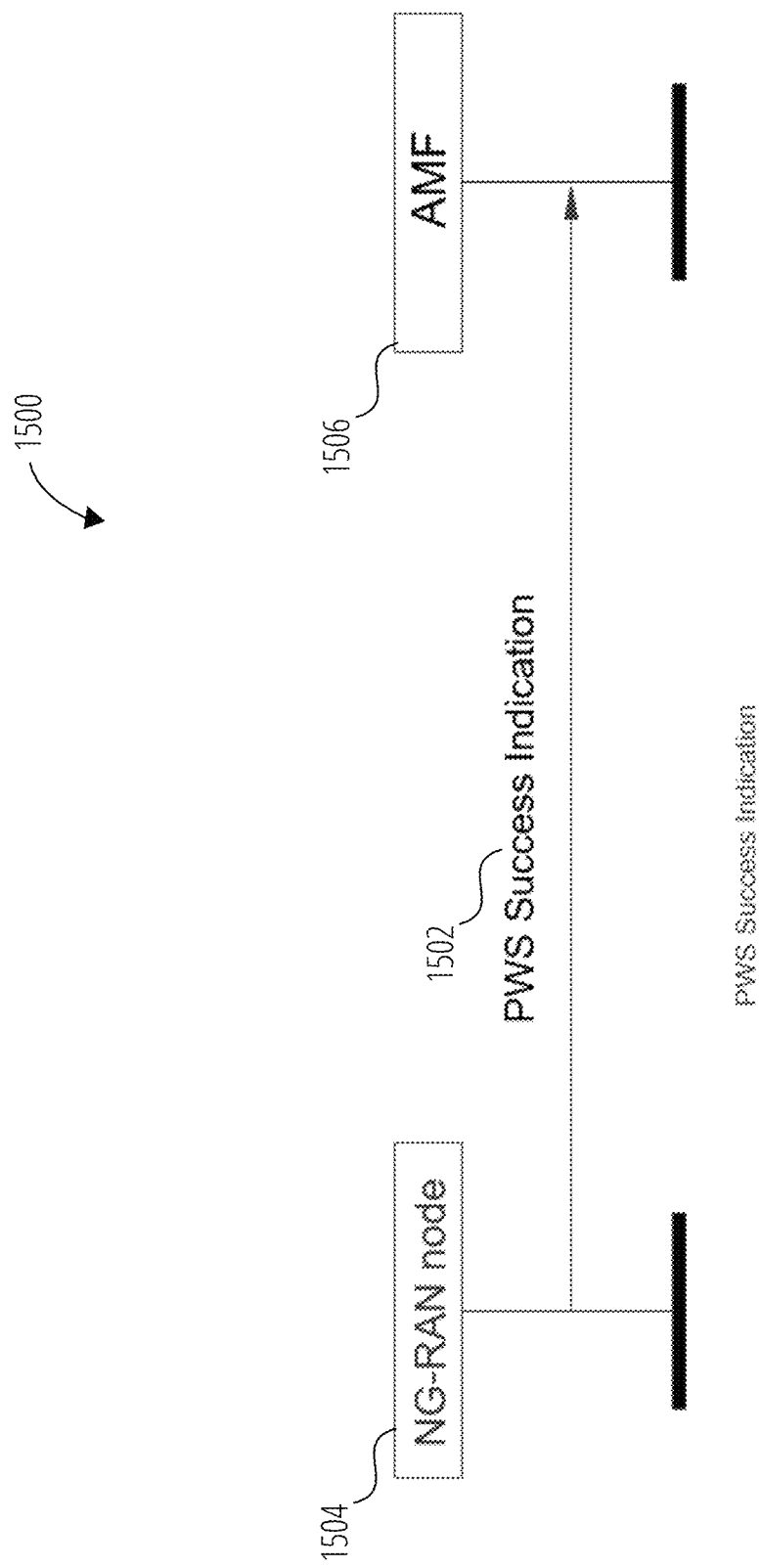
FIG. 15 is a message diagram for a PWS success indication message provided over an NG interface.

FIG. 15 shows an example class 2 message exchange procedure 1500 of a PWS success indication message 1502 provided over an NG interface from an NG-RAN 1504 to an AMF 1506 for indicating successful broadcasting of warning message. The purpose of class 2 message exchange procedure 1500 is to inform AMF 1506 that NG-RAN 1504 has broadcasted a PWS message successfully. Procedure 1500 uses non-UE-associated signaling. And as explained previously, this message 1502 is sent after receiving PWS success indication message 1302 (FIG. 13) over F1 interface from gNB-DU 1304.

NG-RAN 1504 initiates procedure 1500 by sending PWS success indication message 1502 to AMF 1506. On receipt of PWS success indication message 1502, AMF 1506 acts as defined in TS 23.041. There are no applicable abnormal conditions in the example of FIG. 15.

In some embodiments, AMF 1506 tracks (e.g., counts) PWS success indication message 1502 related performance measurements and exposes that information to an NWDAF (e.g., NWDAF 408, FIG. 4) for generating PWS service data analytics. Thus, any information included in PWS success indication message 1502 may be made available to analytics functions.

FIG. 16 shows a table 1600 of IEs included in PWS success indication message 1502 (FIG. 15). For example, the IEs include a message identifier 1602, a serial number 1604, a PWS success NR cell list 1606, an NR CGI 1608, a number of successful broadcast 1610, an E-UTRA CGI 1612, a global RAN node ID 1614, a tracking area identity (TAI) 1616, and an emergency area ID 1618.

Message identifiers 1602 is an IE that identifies the warning message. In some embodiments, networks use message identifiers from the range 4352-6399 (hex 1100 hex-hex 18FF) for PWS, as defined in 3GPP TS 22.268. List defined warning messages with warning message identifier is defined in 3GPP TS 23.041 section 9.4.1.2.2.

Serial number 1604 is an IE that identifies a particular message from the source and type indicated by the message identifier and is altered every time the message with a given message identifier is changed.

E-UTRA CGI 1612 is an IE used to globally identify an E-UTRA cell. It contains PLMN ID+EUTRA cell ID.

PWS success NR cell list 1606 provides a list of NR cells associated with NG-RAN 1504 where PWS broadcasting was successful. NR CGI 1608 is used to globally identify a cell. It contains PLMN ID+NR cell ID. Number of successful broadcast 1610 indicates number of times NG-RAN 1504 has successfully broadcasted received warning messages. The range for this is from 0-65535. This value may be additionally used by a NWDAF (see e.g., NWDAF 408, FIG. 4) for generating broadcast warning service-related data insights and use such generated data to enhance the network efficiency and end-user experience.

TAI 1616 is an IE used to uniquely identify a tracking area. This IE contains PLMN identity+tracking area code (TAC).

Emergency area ID 1618 is an IE used to indicate the area that has the emergency impact. This is defined by the operators.

Global RAN node ID 1614 is an IE used to globally identify an NG-RAN node. For instance, in a gNB, global RAN node ID 1614 is a global gNB ID; in a ng-eNB, it is global ng-eNB ID, and so forth. Global gNB ID contains PLMN ID+gNB ID. Global ng-eNB ID contains PLMN ID+ng-eNB ID.

Figure 17:
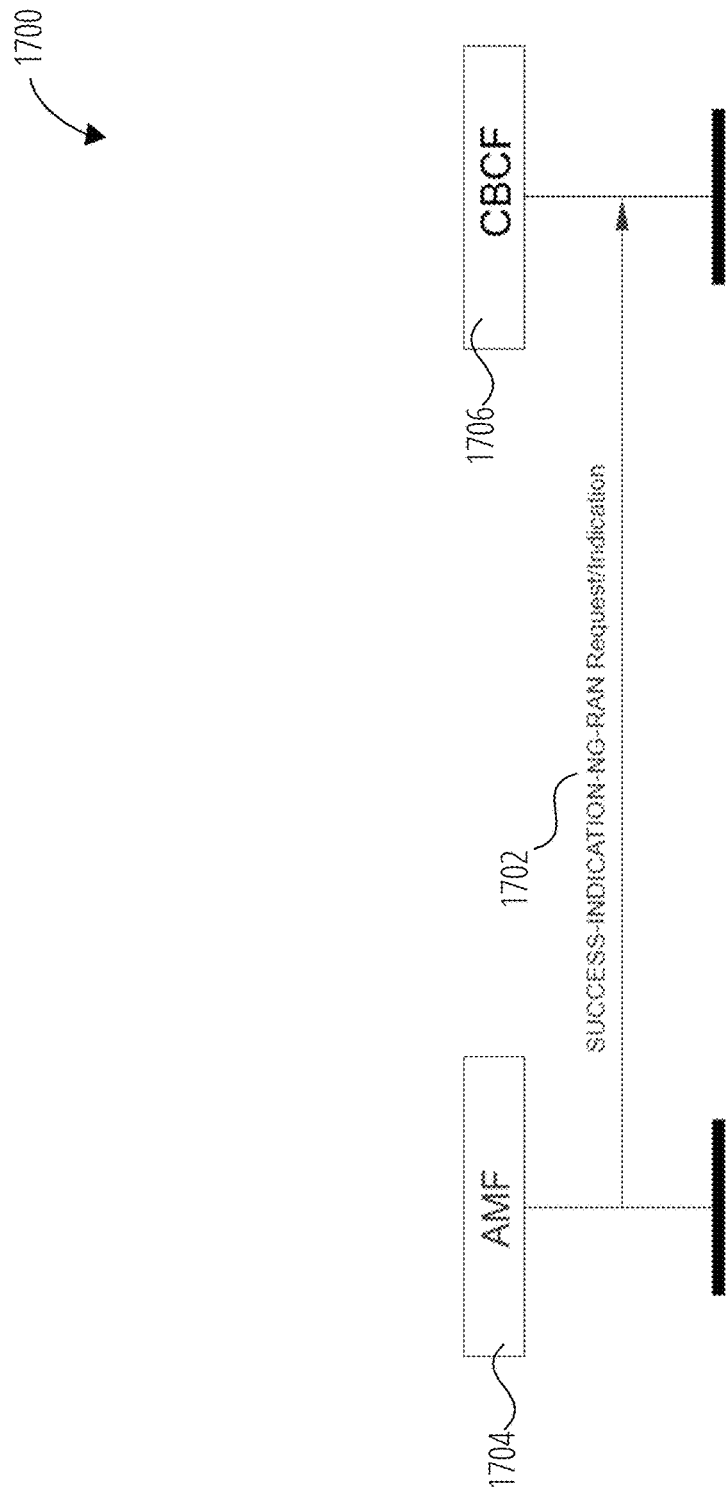
FIG. 17 is a message diagram for a success-indication-NG-RAN request/indication message provided over an Namf interface.

FIG. 17 shows an example class 2 message exchange procedure 1700 of a success-indication-NG-RAN request/indication message 1702 provided over an Namf interface from an AMF 1704 to a CBCF 1706 for indicating successful broadcast of warning message from AMF 1704 towards CBCF 1706. The purpose of procedure 1700 is to inform CBCF 1706 that AMF 1704 has broadcasted a PWS message successfully.

Success-indication-NG-RAN request/indication message 1702 is sent by AMF 1704 to CBCF 1706 upon receipt of PWS success indication message 1502 from NG-RAN 1504 (FIG. 15), to indicate that ongoing PWS operation in one or more cells served by that NG-RAN 1504 has broadcasted successfully. If AMF 1704 interfaces with multiple CBCFs, AMF 1704 will forward the same success-indication-NG-RAN request/indication message to all CBCFs.

In some embodiments, AMF 1704 tracks (e.g., counts) success-indication-NG-RAN request/indication message 1702 related performance measurements and exposes that information to an NWDAF (e.g., NWDAF 408, FIG. 4) for generating PWS service data analytics. Any information included in success-indication-NG-RAN request/indication message 1702 may be made available to analytics functions. Likewise, CBCF 1706 may perform a similar function.

CBCF 1706 receives success-indication-NG-RAN request/indication message 1702 from AMF 1704 and, after successfully processing of message, CBCF 1706 may inform external entity of successful delivery of warning messages. Although CBCF 1706 is shown as a receiving entity with respect to success-indication-NG-RAN request/indication message 1702, in some embodiments it has have additional capabilities and intelligence to drive retransmissions of warning alerts in certain targeted areas. For instance, a CBCF may monitor, measure, and report the PWS success metrics to NWDAF (see, e.g., NWDAF 408) or other external entity along with other key performance indicators (KPIs). A CBCF could also receive API triggers from external entities within an operator network domain to take smart decisions for targeted broadcast warning alert services based on network dynamics.

In some embodiments, AMF 1704 and CBCF 1706 communicate with the NWDAF directly using service based interfaces such as Namf and Ncbcf and/or open standards API event triggers on demand when PWS broadcast warning alerts are sent by the network to the user equipment. Alternately, the NWDAF could also obtain the PWS data insights from the AMF and the CBCF indirectly via open standards interface/APIs via the core network orchestration and management system to be able to track the integrity of warning message service delivery. The information elements described in FIG. 16 and FIG. 18 can be shared by AMF 1704 and CBCF 1706 via the above described techniques to the NWDAF.

Figure 18:
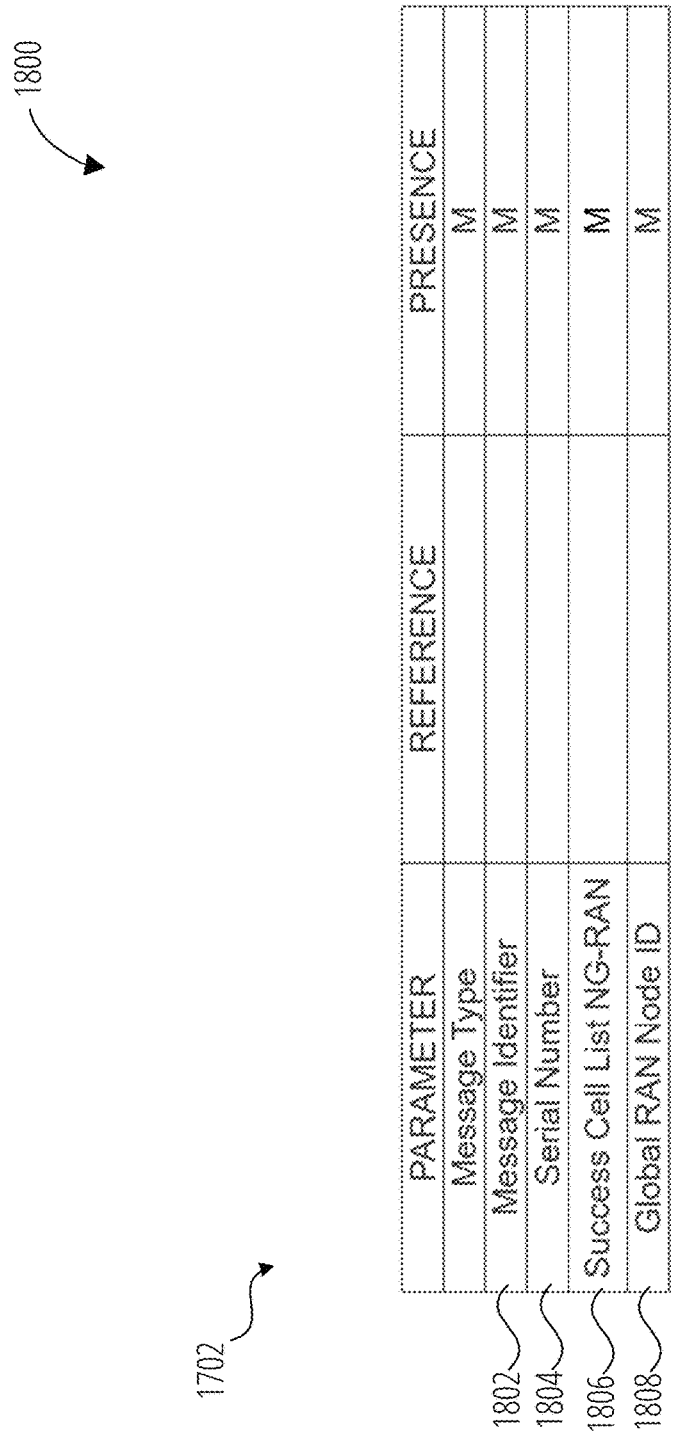
FIG. 18 is a table showing information elements in the success-indication-NG-RAN request/indication message of FIG. 17.

FIG. 18 shows a table 1800 of IEs included in success-indication-NG-RAN request/indication message 1702 (FIG. 17). For example, the IEs include a message identifier 1802, a serial number 1804, a success cell list NG-RAN 1806, and a global RAN Node ID 1808.

Message identifier 1802 is an IE that identifies the warning message. In some embodiments, networks use message identifiers from the range 4352-6399 (hex 1100-hex 18FF) for PWS as defined in 3GPP TS 22.268. List defined warning messages with warning message identifier is defined in 3GPP TS 23.041 section 9.4.1.2.2.

Serial number 1804 is an IE that identifies a particular message from the source and type indicated by the message identifier and is altered every time the message with a given message identifier is changed.

Success cell list NG-RAN 1806 is a parameter applicable for an NG-RAN. Success cell list NG-RAN 1806 IE lists the cells in which PWS broadcasting is successful. It also contains number of times warning messages have been successfully broadcasted. The range for this is 0-65535. This value may be additionally used by an NWDAF (see e.g., NWDAF 408, FIG. 4) for generating broadcast warning service-related data insights and use such generated data to enhance the network efficiency and end-user experience.

Global RAN Node ID 1808 is an IE used to globally identify an NG-RAN node. For a gNB it is a global gNB ID, for an ng-eNB it is global ng-eNB ID, and so forth. Global gNB ID contains PLMN ID+gNB ID and global ng-eNB ID contains PLMN ID+ng-eNB ID.

Figure 19:
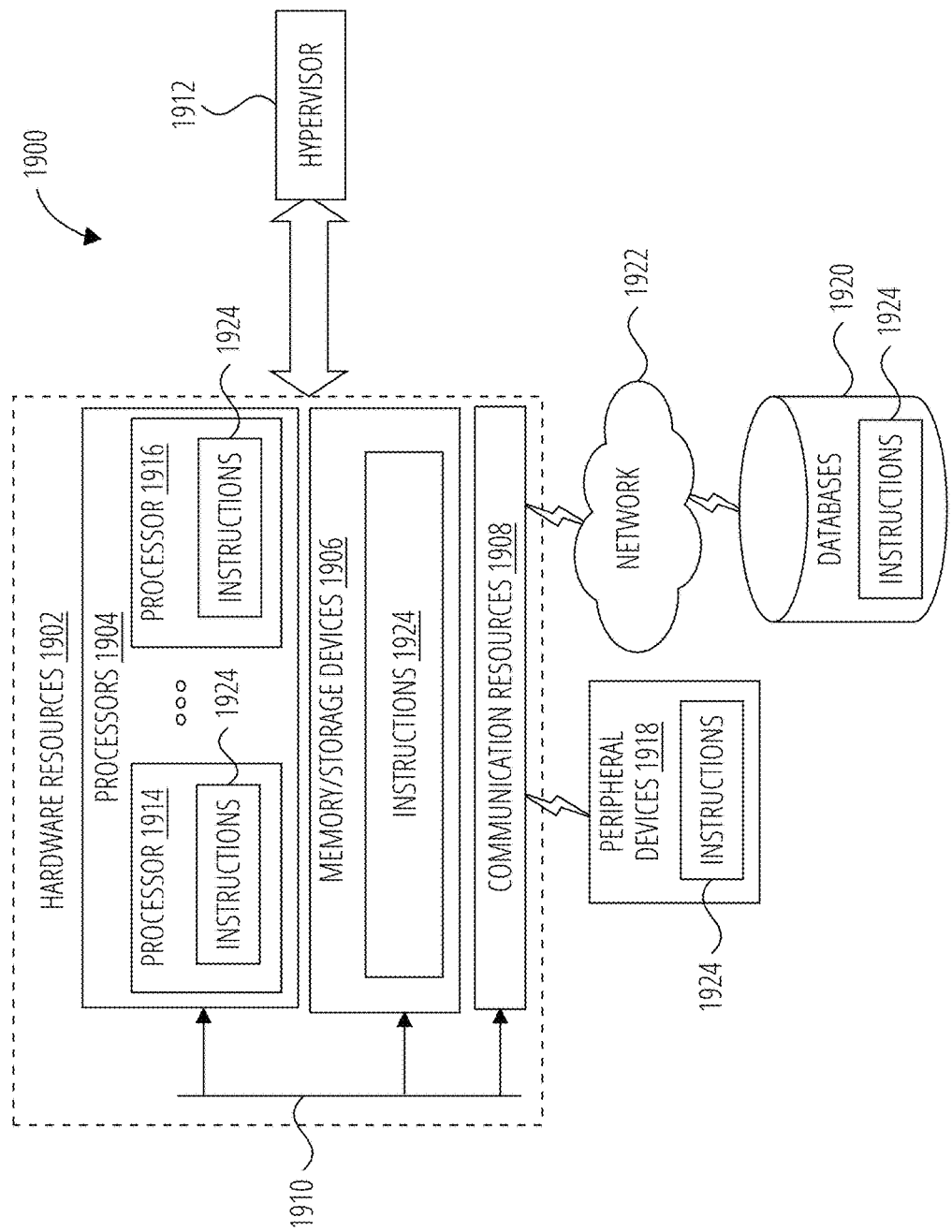
FIG. 19 is a block diagram of computing components for performing the disclosed procedures, in accordance with one embodiment.

FIG. 19 is a block diagram illustrating components 1900, according to some example embodiments, able to read instructions from a machine-readable or computer-readable medium (e.g., a non-transitory machine-readable storage medium) and perform any one or more of the methods discussed herein, such as process 600 (FIG. 6), process 700 (FIG. 7), or process 800 (FIG. 8). Specifically, FIG. 19 shows a diagrammatic representation of hardware resources 1902 including one or more processors 1904 (or processor cores), one or more memory/storage devices 1906, and one or more communication resources 1908, each of which may be communicatively coupled via a bus 1910. For embodiments where node virtualization (e.g., NFV) is utilized, a hypervisor 1912 may be executed to provide an execution environment for one or more network slices/sub-slices to utilize hardware resources 1902.

Processors 1904 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1914 and a processor 1916.

Memory/storage devices 1906 may include main memory, disk storage, or any suitable combination thereof. Memory/storage devices 1906 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1908 may include interconnection or network interface components or other suitable devices to communicate with one or more peripheral devices 1918 or one or more databases 1920 via a network 1922. For example, communication resources 1908 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1924 may comprise software, a program, an application, an applet, an app, or other executable code for causing at least any of processors 1904 to perform any one or more of the methods discussed herein. Instructions 1924 may reside, completely or partially, within at least one of processors 1904 (e.g., within the processor's cache memory), memory/storage devices 1906, or any suitable combination thereof. Furthermore, any portion of instructions 1924 may be transferred to hardware resources 1902 from any combination of peripheral devices 1918 or databases 1920. Accordingly, the memory of processors 1904, memory/storage devices 1906, peripheral devices 1918, and databases 1920 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a distributed unit (DU) for a radio access network (RAN) node in a 5G communication network defining one or more cells, of signaling public warning system (PWS) success indication, the method comprising:
   receiving, from a central unit (CU) via an F1 interface with the DU, a write-replace warning message to trigger warning alert delivery by broadcasting, from a radio unit (RU) via an air interface, a system information block (SIB) including a warning message;
   generating a PWS success indication message for the CU to inform the CU regarding successful delivery of the warning message over the air interface; and
   in response to the RU completing broadcasting of the SIB successfully across the one or more cells, triggering delivery to the CU of the PWS success indication message over the F1 interface.

2. The method of claim 1, in which the triggering delivery to the CU of the PWS success indication message over the F1 interface causes the CU to forward the PWS success indication message to an access and mobility management function (AMF) for forwarding a success-indication-NG-RAN request/indication to a cell broadcast center function (CBCF).

3. The method of claim 1, in which the RAN is an O-RAN and the RU, DU, and CU are disaggregated from each other, or in which the DU and RU form part of a gNB.

4. The method of claim 1, in which the generating the PWS success indication message includes generating a transaction ID information element.

5. The method of claim 1, in which the generating the PWS success indication message includes generating an information element indicating a number of times the DU has successfully broadcasted a received warning message.

6. The method of claim 1, in which the generating the PWS success indication message includes generating a PWS success NR cell global identity (CGI) list having a PWS success NR CGI item information element.

7. The method of claim 1, in which the SIB is one of more of a SIB6, SIB7, and SIB8.

8. The method of claim 1, further comprising providing a PWS success delivery message to a RAN management orchestration engine.

9. A method, performed by a central unit (CU) for a radio access network (RAN) node in a 5G communication network defining one or more cells, of signaling public warning system (PWS) success indication, the method comprising:
   receiving, from a distributed unit (DU) over an F1 interface with the CU, a first PWS success indication message to inform the CU regarding successful delivery of a warning message over an air interface;
   generating a second PWS success indication message for an access and mobility management function (AMF) to inform the AMF regarding successful delivery of the warning message over the air interface; and
   in response to receiving the first PWS success indication message, triggering delivery to the AMF of the second PWS success indication message over an NG interface with the CU.

10. The method of claim 9, in which the generating the second PWS success indication message includes generating a message identifier information element.

11. The method of claim 9, in which the generating the second PWS success indication message includes generating a tracking area identity (TAI) information element.

12. The method of claim 9, in which the generating the second PWS success indication message includes generating an information element indicating a number of times the RAN has successfully broadcasted a received warning message.

13. The method of claim 9, in which the second PWS success indication message includes an emergency area ID.

14. The method of claim 9, in which the generating the second PWS success indication message includes generating a global RAN node ID information element.

15. A method, performed by an access and mobility management function (AMF) in communication with a radio access network (RAN) node in a 5G communication network defining one or more cells, of signaling public warning system (PWS) success indication, the method comprising:
   receiving, from a central unit (CU) over an NG interface with the CU, a PWS success indication message to inform the AMF regarding successful delivery of a warning message over an air interface;
   generating a success-indication-NG-RAN request/indication message for a cell broadcast center function (CBCF) to inform the CBCF regarding successful delivery of the warning message over the air interface; and
   in response to receiving the PWS success indication message, triggering delivery to the CBCF of the success-indication-NG-RAN request/indication message over a Namf interface with the CBCF.

16. The method of claim 15, in which the generating the success-indication-NG-RAN request/indication message includes generating a message identifier information element.

17. The method of claim 15, in which the generating the success-indication-NG-RAN request/indication message includes generating a success cell list NG-RAN to lists cells in which PWS broadcasting is successful.

18. The method of claim 15, in which the generating the success-indication-NG-RAN request/indication message includes generating a global RAN node ID information element.

19. The method of claim 15, further comprising providing the success-indication-NG-RAN request/indication message related performance measurements to a network data analytics function (NWDAF) for generating PWS service data analytics.

* * * * *